United States Patent
Wilham

[11] Patent Number: 6,017,180
[45] Date of Patent: Jan. 25, 2000

[54] AIR ASSISTED GRAVITY SWEEP CONVEYOR

[76] Inventor: John D. Wilham, 420 Highview Rd., East Peoria, Ill. 61611

[21] Appl. No.: 09/027,165

[22] Filed: Feb. 20, 1998

[51] Int. Cl.[7] .................................................. B65G 53/22
[52] U.S. Cl. ............................ 414/305; 414/306; 406/90
[58] Field of Search .................................. 414/305–309; 406/53, 82, 90, 91, 113, 115, 164, 165

[56] References Cited

U.S. PATENT DOCUMENTS

| | | | |
|---|---|---|---|
| 2,589,968 | 3/1952 | Schemm | 406/90 |
| 3,075,657 | 1/1963 | Hazen | 414/297 |
| 3,260,389 | 7/1966 | Paton | 406/91 |
| 3,272,562 | 9/1966 | Kauffman | 406/90 X |
| 3,379,345 | 4/1968 | Gehrung | 222/195 |
| 3,480,331 | 11/1969 | Freeman, Jr. et al. | 406/89 |
| 3,648,860 | 3/1972 | Wennberg | 414/310 |
| 3,800,964 | 4/1974 | Patterson | 414/310 |
| 3,976,232 | 8/1976 | Heidebroek | 222/193 |
| 4,063,654 | 12/1977 | Shivvers | 414/309 |
| 4,078,703 | 3/1978 | Dressler | 222/195 |
| 4,411,674 | 10/1983 | Forgac | 406/90 X |
| 4,417,832 | 11/1983 | Krauss | 406/90 |
| 4,492,508 | 1/1985 | Teske | 414/304 |
| 4,516,898 | 5/1985 | Cantenot | 414/309 |
| 4,553,881 | 11/1985 | Doerr | 406/115 |
| 4,591,075 | 5/1986 | Eriksson | 222/195 |
| 4,626,161 | 12/1986 | Olson et al. | 414/308 |
| 4,806,058 | 2/1989 | Galichowski et al. | 414/304 |
| 5,167,318 | 12/1992 | Siemens | 198/550.01 |
| 5,639,200 | 6/1997 | Jiskoot | 414/310 |

FOREIGN PATENT DOCUMENTS

| | | | |
|---|---|---|---|
| 221431 | 5/1962 | Austria | 406/90 |

*Primary Examiner*—Steven A. Bratlie
*Attorney, Agent, or Firm*—Lockwood, Alex, Fitzgibbon & Cummings

[57] ABSTRACT

A device for removing residual deposits from storage vessels by moving the deposits radially inwardly to a central outlet in the floor of the vessel. The device includes a sweep arm pivotably connected about the central outlet at its inner end and extending outwardly generally parallel with the floor. The sweep arm includes a ramp which plows the deposits up onto a perforated platform which is sloped inwardly towards the outlet. Air pressure is provided into a plenum chamber under the platform so as to create a bearing for the deposits to transverse from the platform to the outlet. A motive drive force is provided so as to pivot the sweep arm about the central outlet thereby plowing the deposits from the floor to the platform and conveying them into the outlet.

44 Claims, 10 Drawing Sheets

1

AIR ASSISTED GRAVITY SWEEP CONVEYOR

SPECIFICATION

BACKGROUND OF THE INVENTION

The present invention relates generally to a mechanical device for removing residual deposits from storage vessels, and more particularly to an apparatus for moving grain radially inwardly to a central outlet in the floor of a cylindrical bin.

Free flowing granular and bulk materials are often deposited in buildings, vehicles or other storage vessels which include a central outlet in their floor allowing the material to be drawn out via gravity. A residual quantity of material inevitably remains within the vessel which does not flow by gravity alone and which typically takes the form of a right angle triangular ridge extending along the base of the vessel. This residual quantity needs to be removed for any number of reasons.

The present invention accomplishes this task both feasibly and economically. Although not limited to any use, the present invention will be described in conjunction with grains and a cylindrical storage bin like those typically located on farms, grain facilities and the like. The scope of the invention is to remove the residual grain after the bin is emptied by gravity to the included central outlet.

In most grain bins, an outlet is provided in the center of the floor so that the majority of the contents can be reclaimed via gravity to the basement, tunnel or space below the floor where it is then typically reclaimed via a conveyor to process or shipping. The residual grain has historically been removed by various means including personnel entering the bin and hand shoveling the remaining grain to the outlet. This is a very time consuming chore sometimes being performed in a very dusty atmosphere, and thus neither feasible nor safe.

There have been various devices developed to mechanically remove the residual grain, including: vacuums, winch operated shovels pulled by wire ropes, pivoting drag conveyors, pivoting plows, and pivoting screw conveyors or augers. The majority of flat bottom storage systems utilize the pivoting screw conveyor. These pivoting screw conveyors or sweep augers have been designed in various forms ranging from the rudimentary to the complex. However, most are of the open screw and backboard configuration, and generally require personnel to enter the bin. To enter a bin where an auger is to operate or is operating is an extremely dangerous undertaking. Many injuries and deaths occur every year from such devices.

These screw conveyors or augers are generally provided with electric or electra-hydraulic drive systems, both to drive the rotary motion of the screw and to drive the conveyor around the bin floor via the pivot point. A major problem with these sweep augers is in applying the motive force to propel the conveyor around the circumference of the bin. The drive predominantly utilized is a rubber tired wheel contacting the floor which drives the conveyor forward. These are subject to loss of traction due to slipping on the grain, requiring personnel to enter the bin.

Accordingly, it is a general object of the present invention to provide a new and improved bin sweep.

It is a more specific object of the present invention to provide an air assisted gravity sweep conveyor for moving grain radially inwardly to a central outlet.

It is still a more specific object of the present invention to provide an apparatus which reclaims the residual grain from the floor of new and existing cylindrical bins either with flat floors or with floors that are conical.

Another object of the present invention is to provide a residual grain reclaiming apparatus which may be utilized in square and rectangular storage vessels.

Yet another object of the present invention is to provide a residual grain reclaiming apparatus which is feasible and safe to operate and maintain.

Still another object of the present invention is to provide a residual grain reclaiming apparatus which does not require personnel to enter the bin.

SUMMARY OF THE INVENTION

The invention is directed to a device for moving residual deposits radially inward to a central outlet in the floor of a granular and bulk material storage vessel. A rotatable hub is positioned about the center of the storage vessel and a sweep arm is pivotably mounted at its inner end to the hub for rotation thereby and extends outwardly generally parallel with the floor, and operative to pivot in a vertical plane about its inner connection. The sweep arm includes a ramping member and a perforated deck generally transversing its length. A means for supplying air through the perforated deck and a means for rotating the sweep arm about the support member are provided whereby the residual deposits are ramped onto the perforated deck and conveyed to the central outlet.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
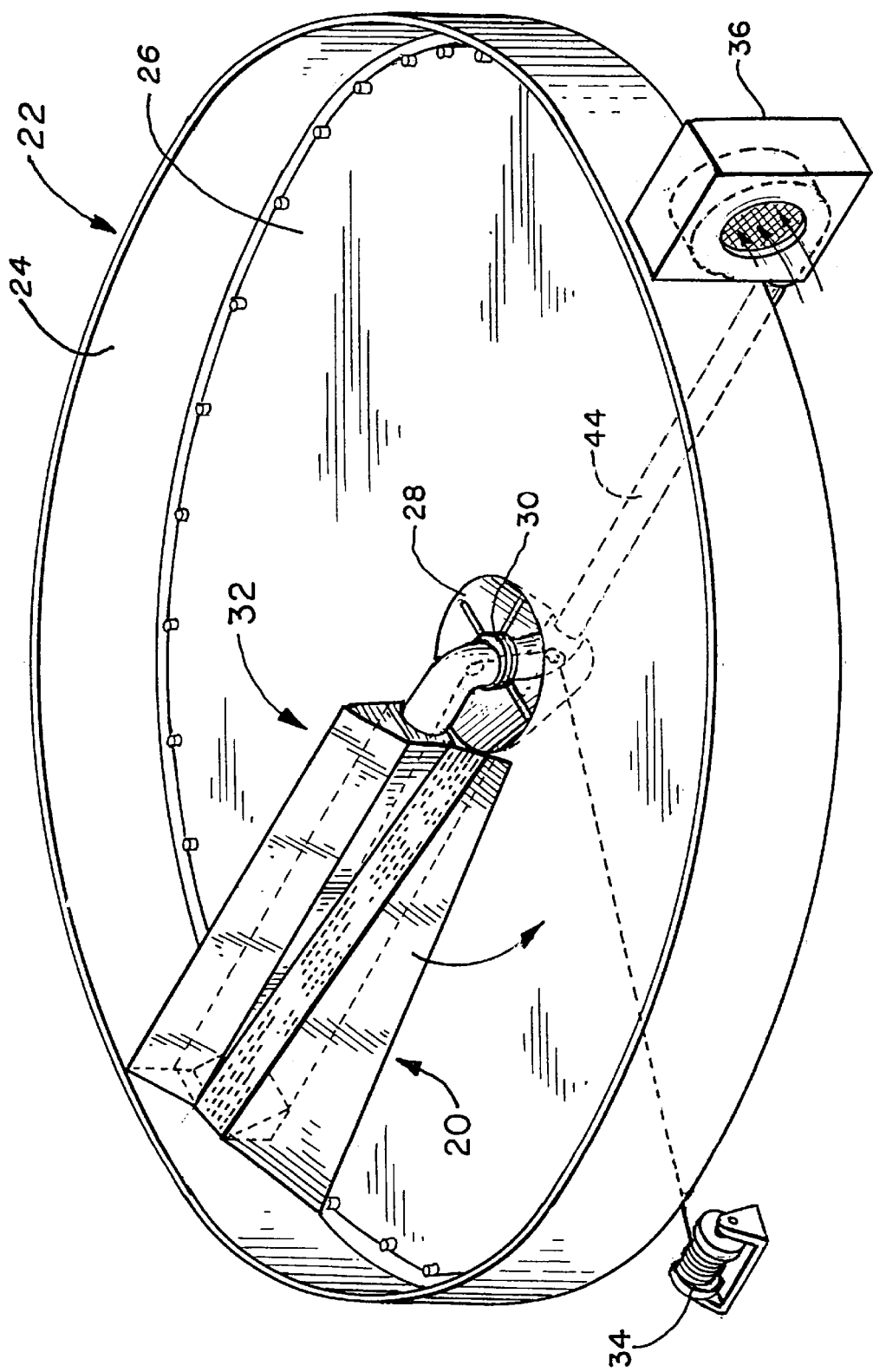
FIG. 1 is a perspective view of an air assisted gravity bin sweep conveyor constructed in accordance with the invention shown within a conventional flat bottom cylindrical storage bin.

Referring to the drawings, and particularly to FIG. 1, an air assisted gravity bin sweep conveyor 20 for use with a conventional cylindrical storage bin 22 is shown. The cylindrical bin 22 includes a curved wall 24 and a flat bottom floor 26 with a central outlet 28. The bin sweep 20 includes a rotatable hub or support member 30 and a sweep arm 32. In the preferred embodiment, the sweep arm 32 is rotated by a wire rope drive and winch 34 located outside of the bin 22. Also located outside of the bin 22, in the preferred embodiment, is the fan 36 which supplies air to the sweep arm.

Figure 2:
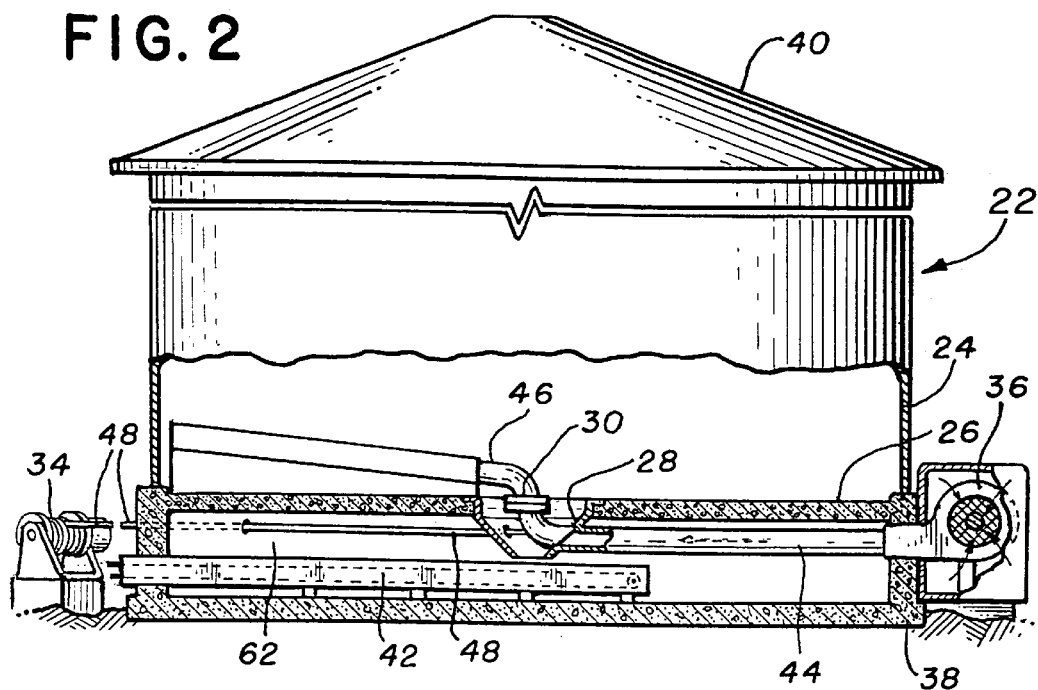
FIG. 2 is a side cross-sectional view of FIG. 1.

Cylindrical bin 22, in accordance with conventional practice, and as shown in FIG. 2, includes a structurally sound underground foundation 38 which supports the whole of the bin including the wall 24, any ceiling or roof 40, the flat bottom floor 26 and any material stored within the bin. Within this foundation, the central outlet 28 leads to a reclaim conveyor 42 which conveys the material to a location outside of the bin after it has been emptied through the outlet 28. The fan 36 introduces air to the sweep arm by a duct 44 under the bin floor 26 that travels up through the bin outlet hopper (central outlet 28) to a large diameter pivoting duct 46. In the circumstances of handling grain and some other products that require aeration airflow to ward off spoilage during periods of storage, the fan can also be utilized to provide this aeration. Alternatively, the fan may be mounted directly on the sweep conveyor when the apparatus is to be utilized in a bin storing a product that is neither corrosive, flammable or explosive. Some bulk products do not produce an explosive dust, so that the fan can be applied in that atmosphere, even inside the bin. This alternate method of providing air pressure to the plenum chamber would negate the extra cost of running the ducting down into the tunnel and outside the bin, and would make retro-fitting an existing bin a simple task.

Figure 3:
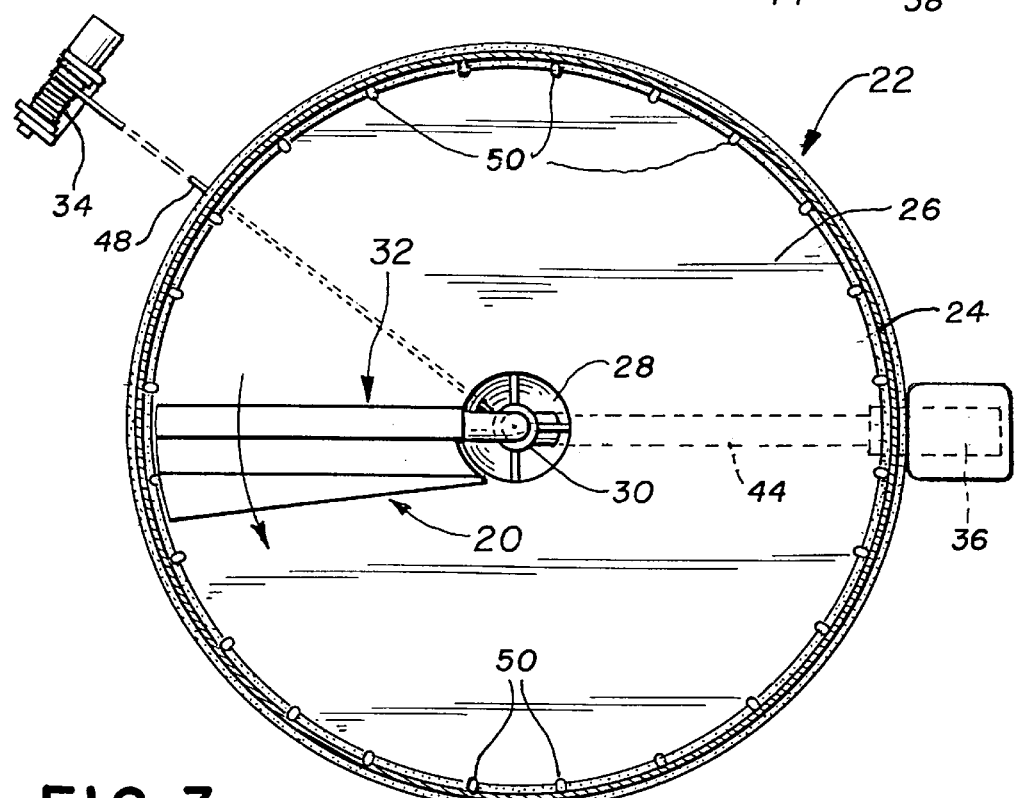
FIG. 3 is a top plan view of FIG. 1.
Figure 4:
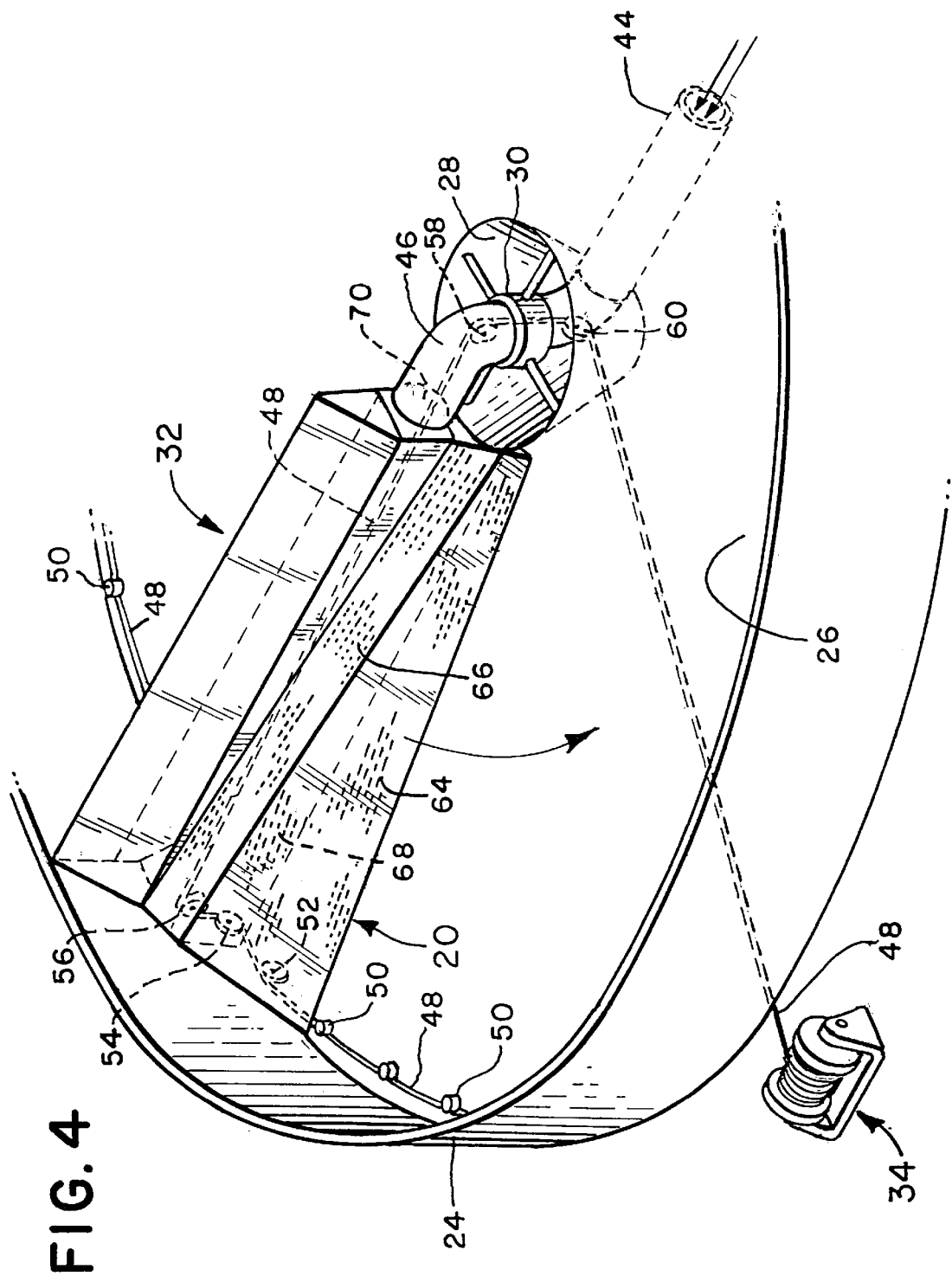
FIG. 4 is a perspective view of the sweep arm constructed in accordance with the invention shown in FIG. 1.
Figure 5:
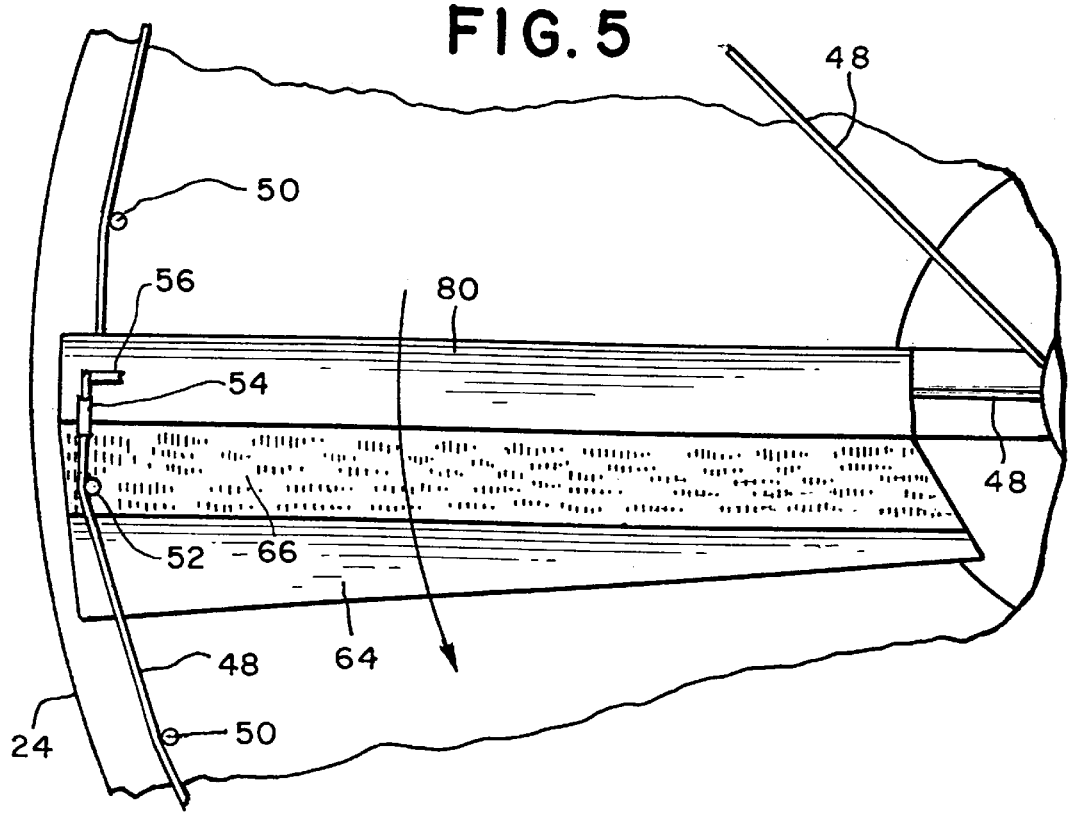
FIG. 5 is a top plan view of FIG. 4.

The motive power to pivot the sweep conveyor 20 around the bin 22 can be applied by several methods, the preferred embodiment of which is depicted in FIGS. 3–5. A wire cable or rope 48 is routed around pins 50 fitted into the bin floor 26 and routed through a series of pulleys 52, 54, 56, 58 and 60 (FIG. 4) down through the center outlet 28 to a winch 34 located in the tunnel 62 (FIG. 2), the basement below, or just outside the bin circumference. In operation, the winch 34 reels in the wire rope 48 via pulley 52 engaging it between the pins 50 and the bin wall 24, to pulley 54, to pulley 56, through the sweep arm 32, to pulley 58, to pulley 60, out to the winch. This reeling in of the wire rope 48 will in effect pivot the sweep conveyor 20 about the central outlet 28 and around the bin 22.

Figure 6:
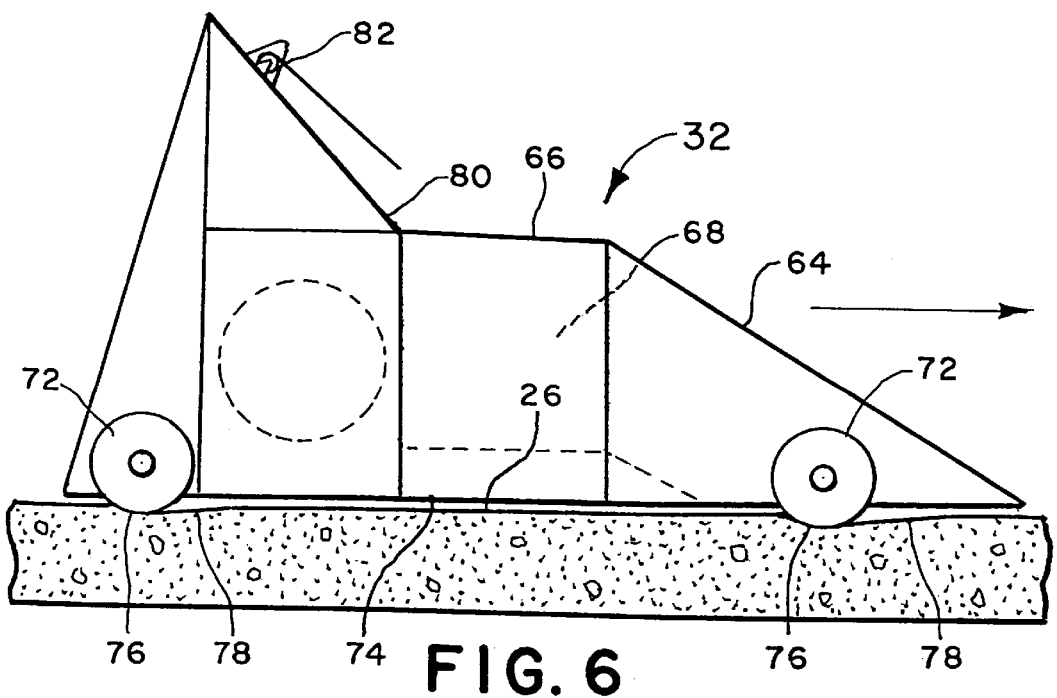
FIG. 6 is an end view of the sweep arm of FIG. 4 shown looking towards the bin center.
Figure 7:
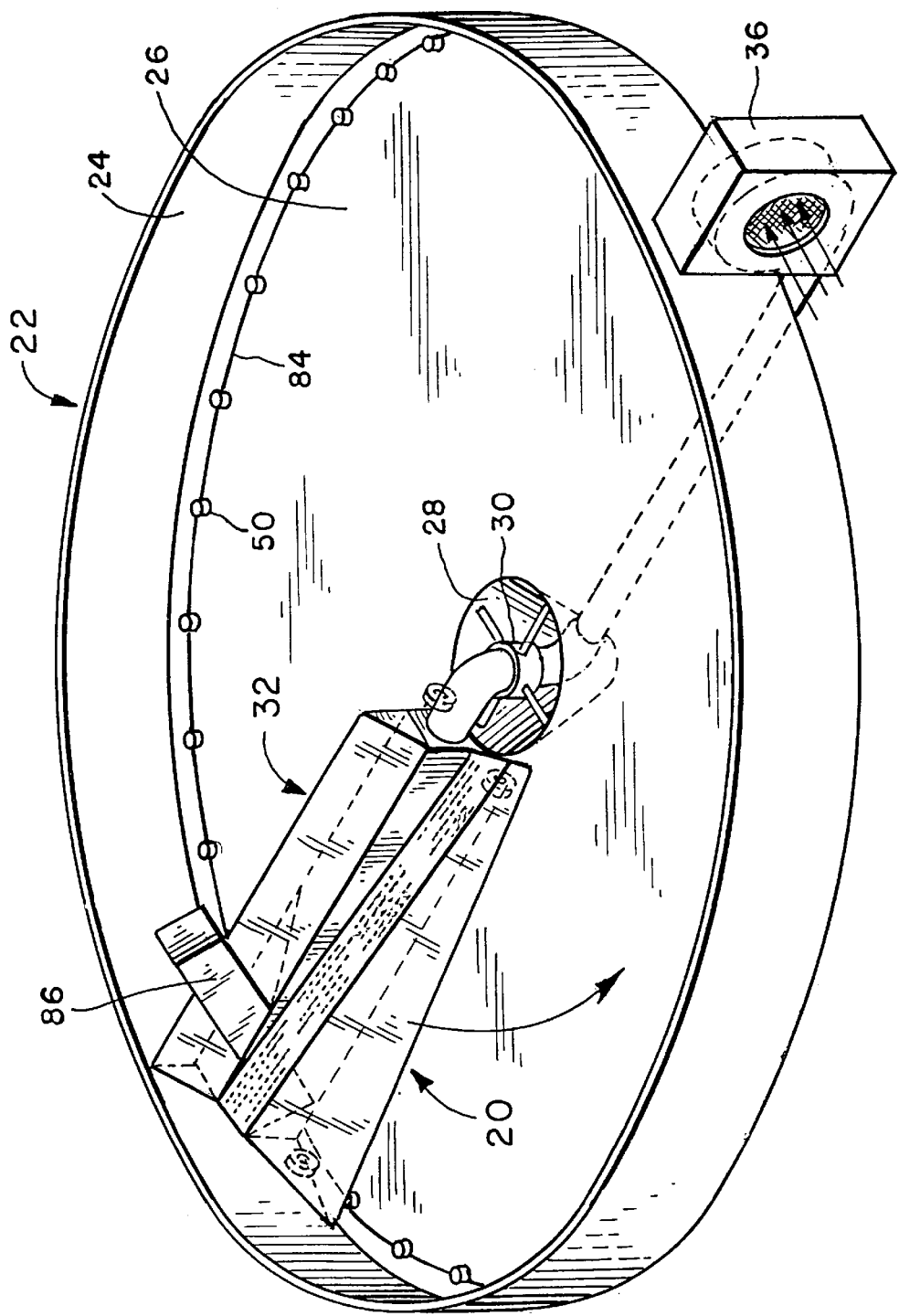
FIG. 7 is a perspective view of an alternate embodiment of an air assisted gravity bin sweep conveyor constructed in accordance with the invention within a conventional cylindrical storage bin.
Figure 8:
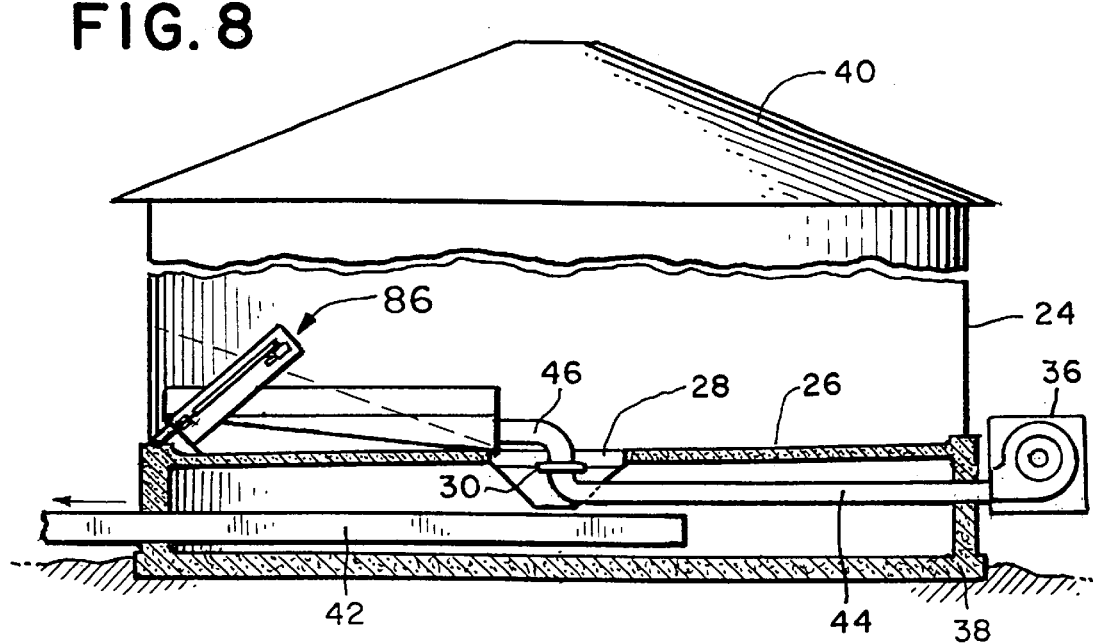
FIG. 8 is a side sectional view of FIG. 7.
Figure 9:
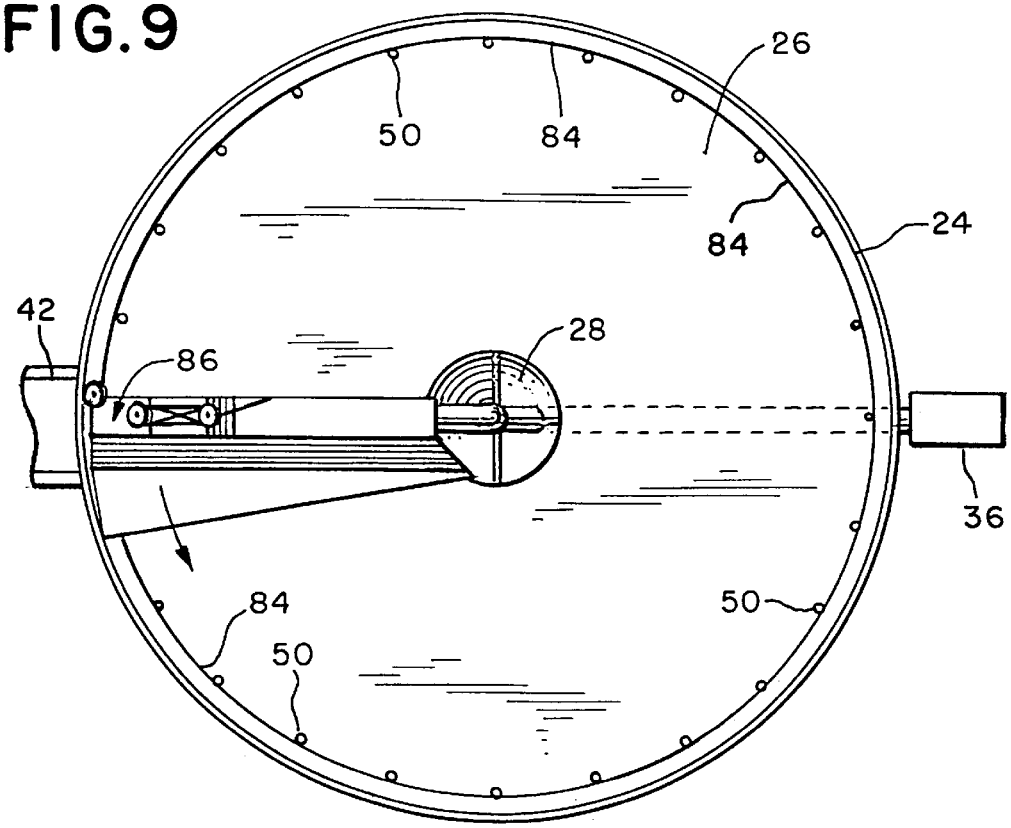
FIG. 9 is a top plan view of FIG. 7.
Figure 10:
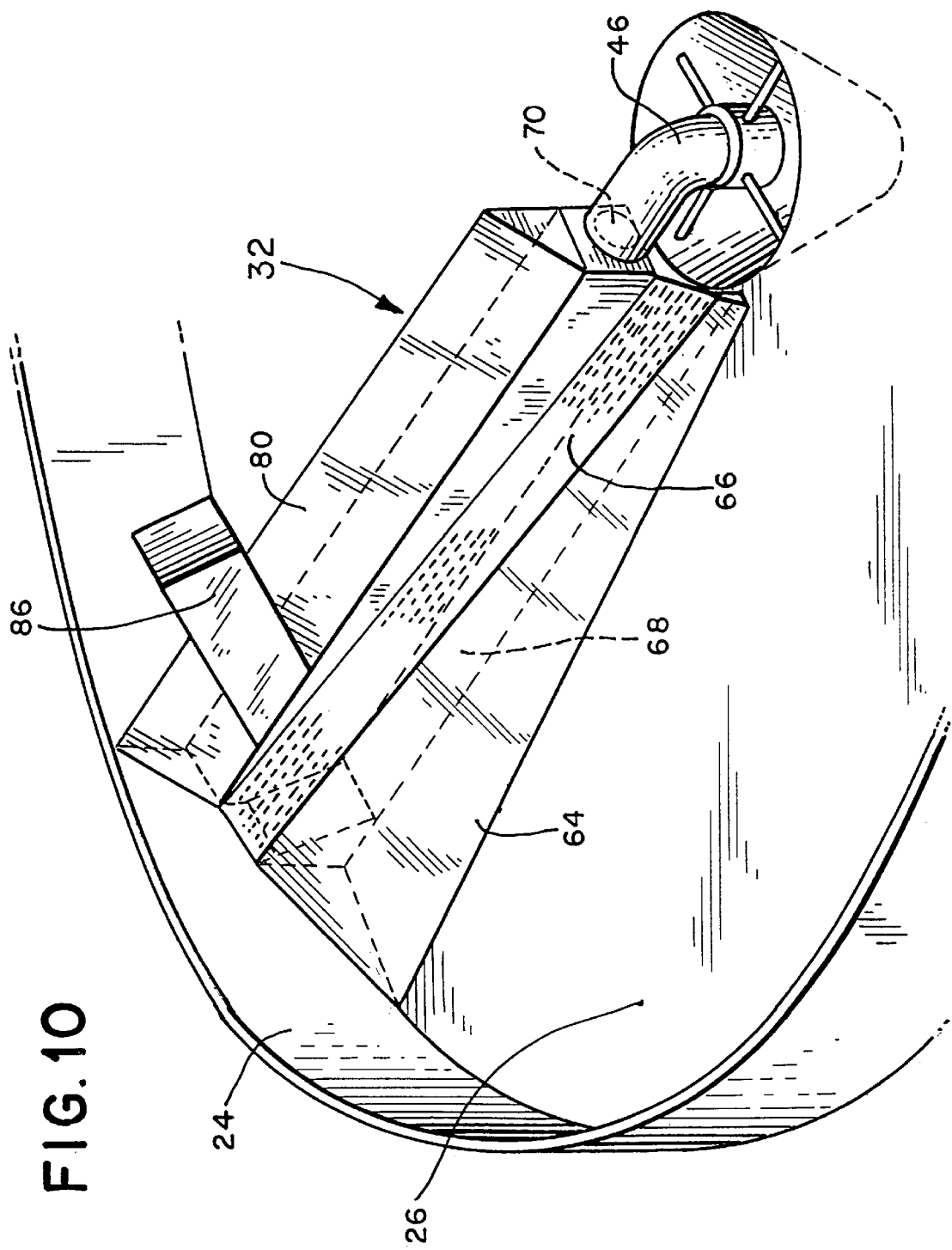
FIG. 10 is a perspective view of the sweep arm constructed in accordance with the invention shown in FIG. 7.

The sweep conveyor 20 of the preferred embodiment is more particularly depicted in FIG. 4–6. The sweep conveyor 20 is nominally the same length as is the radius of an empty bin. The leading edge of the sweep arm 32 has a ramp 64 to plow the grain up onto the top or deck 66 which is perforated and preferably embossed. When air is introduced into the plenum chamber 68 via pivoting duct 46 and inlet 70, it will be forced through the perforated deck 66. The perforated deck 66 is preferably declined (but need not be) from its outer edge near the bin wall 24 to the central outlet 28. The air escaping through the perforations levitates the product being conveyed, causing a near perfect bearing. The decline in the deck then allows gravity to convey the product to the bin center where it falls through an opening 28 to a conventional screw, belt or drag conveyor in the tunnel below. If the deck is also embossed, the air escaping through the deck not only levitates the grain burden, but provide directional flow towards the bin center outlet 28 as well.

The sweep conveyor 20 is supported by steel disks 72 being utilized as wheels which allow some clearance between the conveyor bottom 74 and the bin floor 26. FIG. 6 depicts a view of the sweep arm 32 looking from the bin wall 24 towards the bin center. FIG. 6 shows the conveyor parked and rigged to be covered with grain when the bin is being loaded. The wheels 72 are recessed in individual slots 76 sawn in to the floor 26 that are ramped 78 to the floor level so that in the first few inches of travel, the wheels 72 roll up ramps 78, resulting in clearance between the bottom 74 of the conveyor and the floor 26. The path of these wheels 72 is circumferential with the axles being aligned with the radii. The recessed wheels allow the conveyor to lie flat on the floor in order to escape damage from the extreme weight of the grain or materials when the bin is loaded.

After the bin is conventionally unloaded through the central outlet 28, the present invention will be activated to empty any residual deposits left within the bin. At the onset, the air supply is turned on, and only the material near the discharge begins to move. As the grain or material begins to be conveyed away, more and more of the length of the air assisted gravity sweep conveyor progressively begins to convey grain or materials exposed until it has evacuated a valley in the residual grain or material in the bin. At this point, the valley floor is the perforated embossed deck 66. Now, the motive force is then engaged and the air assisted gravity sweep conveyor begins to move forward clearing nearly all the grain or materials in the bin as it makes a complete cycle. Personnel would then enter the bin after it was emptied to re-rig the wire rope 48 and reset the air assisted gravity conveyor for the next bin filling.

The trailing edge of the conveyor has a backboard 80 that retains the grain burden, not allowing it to flow over the conveyor onto the floor already cleaned. This backboard 80 may have a pressure switch 82 which stops the motive energy whenever to much forward speed or an avalanche of material activates it. When the conveyor clears away the added grain burden, the pressure switch 82 reactivates the forward motion again. A "plug" switch (not shown) may be incorporated into the sump at the center of the bin so that if the capacity of the sweep conveyor exceeds the capacity of the secondary conveyors 42 under the floor 26 or in the tunnel 62, or if the secondary conveyors are not turned on or malfunction, it will stop both the air producing fan 36 and the motive force 34.

An alternate motive drive for the air assisted gravity sweep conveyor 20 for use with a conventional cylindrical storage bin 22 is shown in FIGS. 7–10. The cylindrical bin 22 includes a circular wall 24 and a flat bottom floor 26 with a central outlet 28. The bin sweep 20 includes a rotatable hub or support member 30 and a sweep arm 32. In this alternate embodiment, the sweep arm 32 is rotated by a grommet or endless loop of wire rope 84 consisting of several electrically or hydraulically driven pulleys and several idler pulleys mounted within a housing 86 on the conveyor. A single spring loaded idler pulley will be used to maintain tension on the wire rope 84 before it is allowed to re-lay upon the pin diameter. This alternate motive drive configuration will allow the bin sweep 20 to make multiple passes around the bin without personnel entering the bin.

Figure 11:
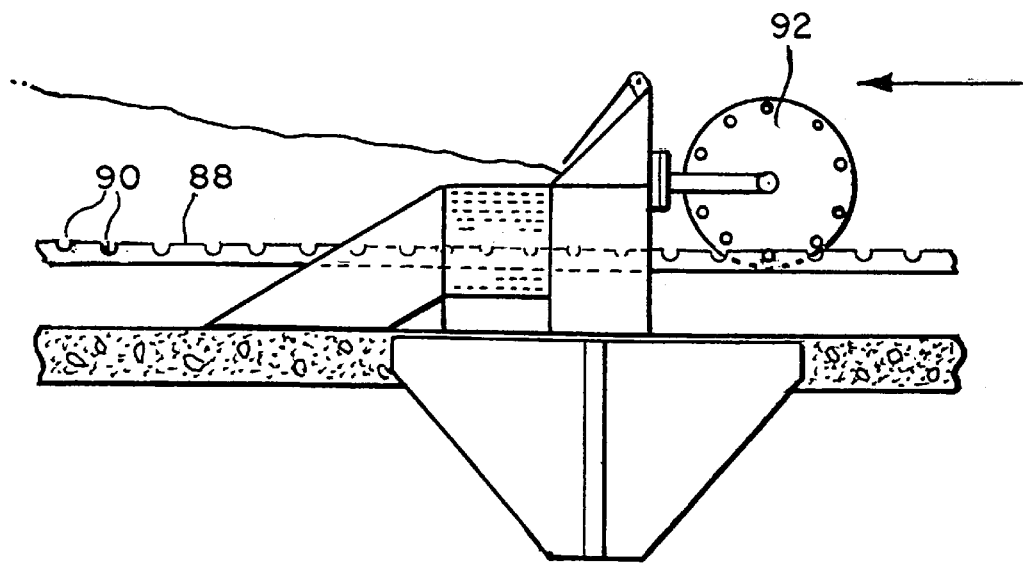
FIG. 11 is an end view of an alternate form of the sweep conveyor constructed in accordance with the invention shown looking towards the bin center.

Another alternate motive drive is shown in FIG. 11. This drive consists of a circular stationary rack 88 including gears 90 which generally follow the diameter of the storage vessel. An electric or hydraulic pinion gear 92 is then mounted on the sweep conveyor and is driven by an electric or hydraulic motor and speed reducer. The rotation of the pinion gear 92 provide a motive force for the sweep arm as it engages the rack 88 and gear 90 to pivot the sweep arm about the central outlet. The rack is elevated so that as the sweep moves, the repose of any residual material will be below the rack and gear so as not to impede the meshing of the pinion pins to the rack gear.

Figure 12:
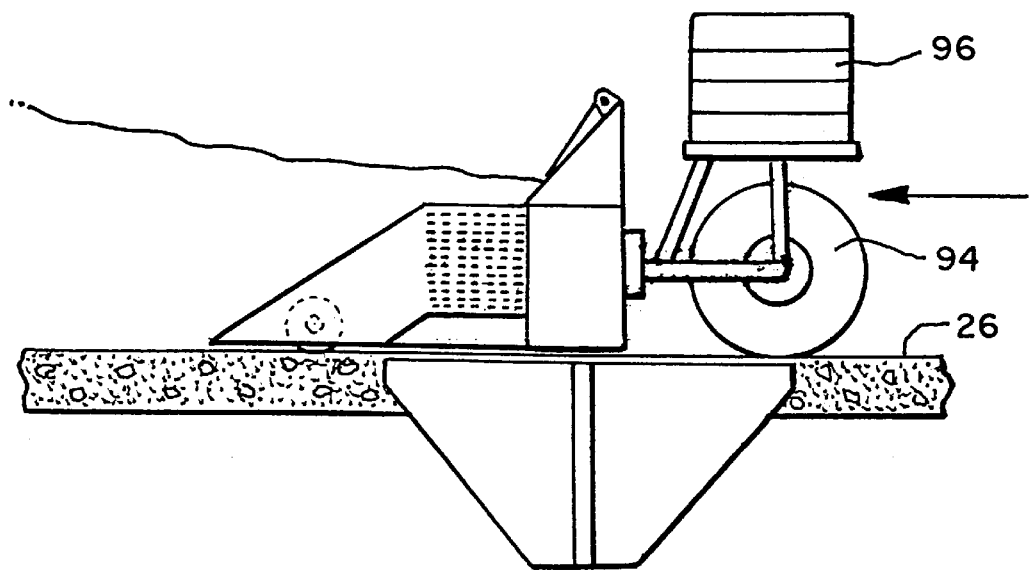
FIG. 12 is an end view of an alternate form of the sweep conveyor constructed in accordance with the invention shown looking towards the bin center.

Yet another alternate motive drive is shown in FIG. 12. This drive consists of a wheel with a pneumatic tire 94 with a weighted box 96 to improve traction upon the bin floor 26. The drive is powered by an electric or hydraulic motor and speed reducer mounted directly on the sweep conveyor.

Figure 13:
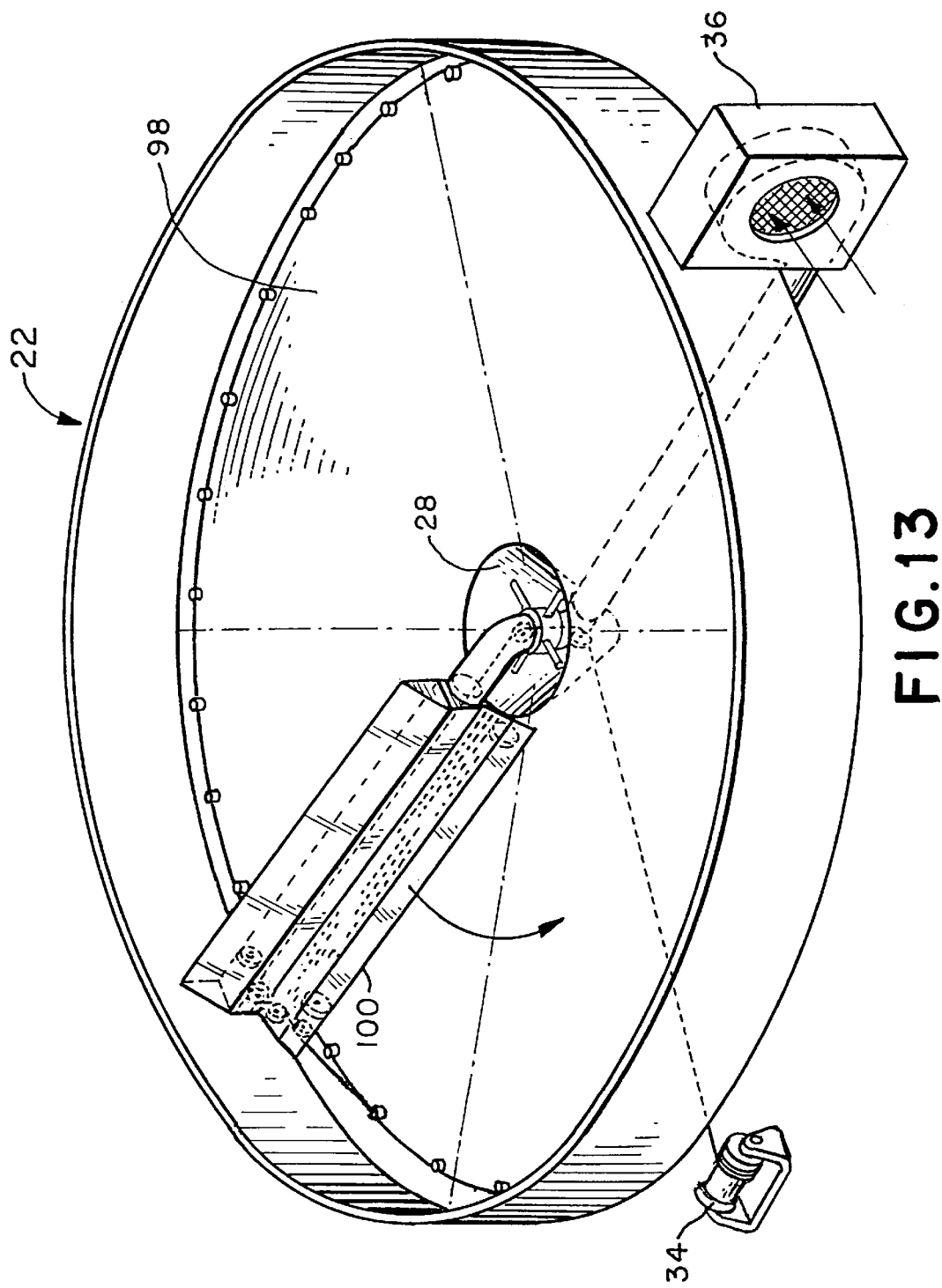
FIG. 13 is a perspective view of an air assisted gravity bin sweep conveyor constructed in accordance with the invention shown within a conical floored cylindrical storage bin.
Figure 14:
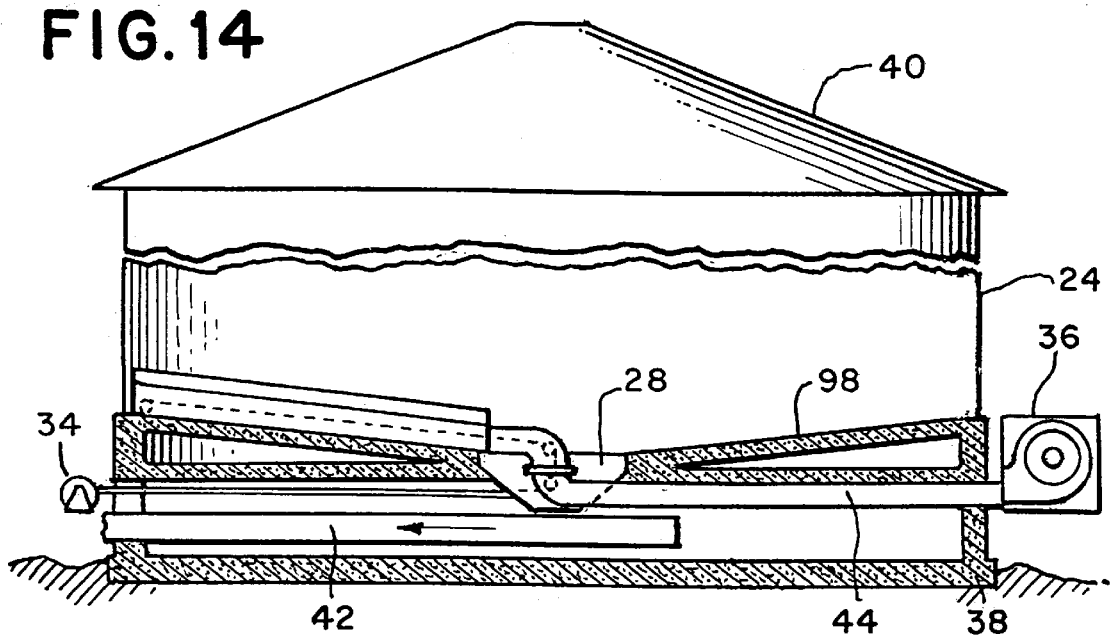
FIG. 14 is a side cross-sectional view of FIG. 13.
Figure 15:
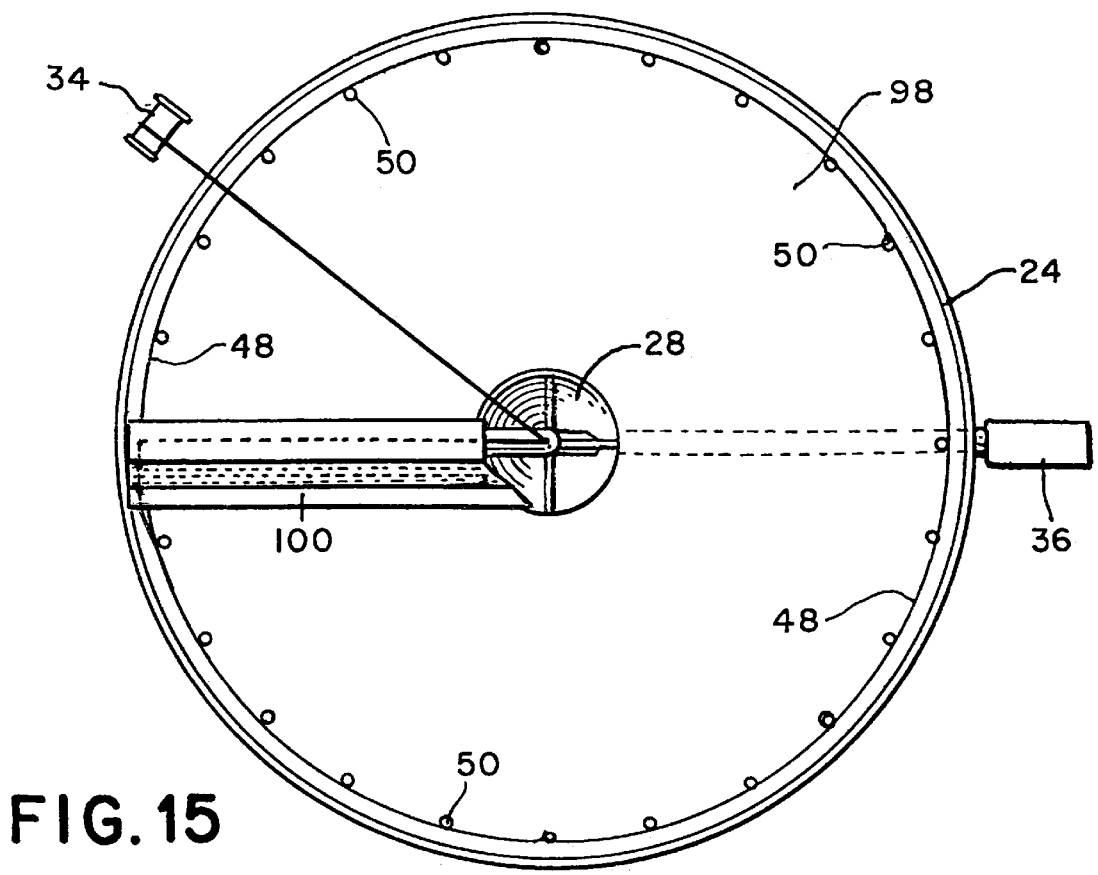
FIG. 15 is a top plan view of FIG. 13.

FIGS. 13–15 depict an alternate design of the conveyor sweep 20 for a new storage bin construction. The new bin design consists of a conical concrete or steel floor 98, hoppered with a slope in excess of 3 degrees. This, in turn, will provide a lower profile configuration of the sweep conveyor, and in particular a straight edge ramp 100, as compared to ramp 64, as the decline in this configuration is in the floor 98, rather than the conveyor and ramp 64.

The air assisted gravity sweep conveyor of the present invention may be configured into a portable application that could be carried from bin to bin. This would require a combination of the alternative drives and methods of supplying pressurized air to the plenum on the sweep conveyor. The fan and the winch or other motive force will be mounted directly on the air assisted gravity conveyor if the conveyor is to be portable.

Alternative to the portability of the sweep conveyor is the portability of the motive drive, and in particular the winch embodiment, utilized at a plant that has multiple bins and only occasional cycling of the product. A single winch can be utilized by transferring the winch from bin to bin. This could greatly reduce the cost of multiple installations at a single plant site. Additionally, if the product does not require aeration, then a single fan may be transferred from bin to bin, also greatly reducing the cost of multiple installations at a single plant site.

Although the air assisted gravity sweep conveyor has been described in conjunction with conventional cylindrical storage bins, it will be understood that the present invention may be applied to other types of storage vessels. Particularly, there currently exists a vast amount of square and rectangular buildings being used for the storage of bulk materials. When used in such a setting, the present invention will remove the majority of grains and materials without a workman to supervise the operation. Those grains or materials outside the circle of operation would remain for cleanup by other means.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A device for moving residual deposits radially inward to a central outlet in a storage vessel, said vessel having a wall forming a cylindrical chamber and a floor, said device comprising:

a hub located centrally on the floor;

a sweep arm attached at one end to said hub and extending radially outwardly over the floor to the wall;

said hub being rotatable whereby said sweep arm sweeps substantially the entire surface of said floor;

said sweep arm having a ramp up surface along its leading edge for transporting the deposits from the floor to an air conveyor positioned generally atop said sweep arm;

means for pressurizing said conveyor to direct said deposits from said arm to said hub; and means for driving said arm about said hub.

2. A device for moving residual deposits as defined in claim 1 wherein said conveyor is a perforated deck sloped toward said central outlet.

3. A device for moving residual deposits as defined in claim 1 wherein said conveyor is a perforated deck and is further embossed towards said central outlet.

4. A device for moving residual deposits as defined in claim 1 wherein said ramp up surface further includes perforations.

5. A device for moving residual deposits as defined in claim 4 wherein said ramp up surface is further embossed towards said central outlet.

6. A device for moving residual deposits as defined in claim 1 wherein said pressurizing means includes a fan located outside of said vessel, said fan providing air pressure by a duct tine to a plenum chamber located beneath said conveyor.

7. A device for moving residual deposits as defined in claim 6 wherein said fan is portable.

8. A device for moving residual deposits as defined in claim 1 wherein said device is portable.

9. A device for moving residual deposits as defined in claim 1 further including disks mounted on a bottom of said device to facilitate rotation of said sweep arm, said disks positioned within a recess in said floor when said storage vessel is storing material.

10. A device for moving residual deposits as defined in claim 1 further including a trailing edge of said arm, said trailing edge includes a pressure switch, said pressure switch operable to delay the rotation of said sweep arm.

11. A device for moving residual deposits as defined in claim 1 wherein said driving means includes a cable routed around an outer circumference of said central outlet, said driving means further including a series of pulleys.

12. A device for moving residual deposits as defined in claim 11 wherein said driving means further includes a winch, said winch powered to reel in said rope thereby rotating said sweep arm about said hub.

13. A device for moving residual deposits as defined in claim 12 wherein said winch is portable.

14. A device for moving residual deposits as defined in claim 11 wherein said cable forms an endless loop and said sweep arm is rotated around said loop, said pulleys are power driven and mounted on said device.

15. A device for moving residual deposits as defined in claim 1 wherein said driving means includes a rack gear routed around an outer circumference of said central outlet, said rotating means further including a pinion gear mounted on said sweep conveyor, said pinion gear driven by a motor mounted on said device.

16. A device for moving residual deposits as defined in claim 1 wherein said driving means includes a wheel mounted on said device, said wheel in contact with said floor and powered by a motor mounted on said device.

17. A portable device for moving residual deposits radially inward to a central outlet in the floor of a storage vessel, comprising:

a sweep arm detachably and rotatably mounted at its inner end to said outlet for rotation thereby, said arm extending outwardly and being operative to rotate about its inner connection, said arm having a perforated deck positioned generally on its top;

a ramping member positioned on a leading edge of said arm;

a means for supplying air through said perforated deck; and a means for rotating said sweep arm about said outlet whereby said residual deposits are ramped onto said deck and conveyed to said outlet.

18. A portable device for moving residual deposits as defined in claim 17 wherein said deck is sloped toward said central outlet.

19. A portable device for moving residual deposits as defined in claim 17 wherein said perforated deck is further embossed towards said central outlet.

20. A portable device for moving residual deposits as defined in claim 17 wherein said ramping member further includes perforations.

21. A portable device for moving residual deposits as defined in claim 20 wherein said ramping member is further embossed towards said central outlet.

22. A portable device for moving residual deposits as defined in claim 17 wherein said air supplying means includes a fan mounted on said device, said fan providing air pressure to a plenum deck chamber located beneath said deck.

23. A portable device for moving residual deposits as defined in claim 17 further including disks mounted on a bottom of said device to facilitate rotation of said sweep arm, said disks positioned within a recess in said floor when said storage vessel is storing material.

24. A portable device for moving residual deposits as defined in claim 17 wherein a trailing edge of said sweep arm further includes a pressure switch, said pressure switch operable to delay the rotation of said sweep arm.

25. A portable device for moving residual deposits as defined in claim 17 wherein said rotating means includes a cable routed around an outer circumference of said central outlet, said rotating means further including a series of pulleys.

26. A portable device for moving residual deposits as defined in claim 25 wherein said cable forms an endless loop and said sweep arm is rotated around said loop, said pulleys are power driven and mounted on said device.

27. A portable device for moving residual deposits as defined in claim 17 wherein said rotating means includes a wheel mounted on said device, said wheel in contact with said floor and powered by a motor mounted on said device.

28. A portable device for moving residual deposits as defined in claim 17 wherein said rotating means includes a rack gear routed around an outer circumference of said central outlet, said rotating means further including a pinion gear mounted on said sweep arm conveyor, said pinion gear driven by a motor mounted on said device.

29. An apparatus for transporting the residual material, left in a storage vessel after emptying said material through a central outlet in the floor, from the floor to the central outlet, comprising:

a sweep arm having a top, a bottom, a leading edge, a trailing edge, a first end, and a second end, said sweep arm pivotably mounted at its first end about said outlet for rotation thereby and being operative to pivot about said outlet;

a perforated deck on said top of said sweep arm having a plenum chamber positioned underneath, said deck generally transversing a length of said sweep arm from said first to said second end;

a ramping member on said leading edge, said ramping member generally transversing said length;

a means for supplying air pressure into said chamber for release through said perforated deck; and a means for rotating said arm about said outlet whereby said material is ramped onto said deck and conveyed to said outlet.

30. An apparatus for transporting residual material as defined in claim 29 wherein said deck is sloped from said second end to said first end.

31. An apparatus for transporting residual material as defined in claim 29 wherein said perforated deck is further embossed towards said central outlet.

32. An apparatus for transporting residual material as defined in claim 29 wherein said ramping member further includes perforations.

33. An apparatus for transporting residual material as defined in claim 32 wherein said ramping member is further embossed towards said central outlet.

34. An apparatus for transporting residual material as defined in claim 29 wherein said air supplying means includes a fan located outside of said vessel, said fan providing air pressure by a duct line to said plenum chamber.

35. An apparatus for moving residual deposits as defined in claim 34 wherein said fan is portable.

36. An apparatus for transporting residual material as defined in claim 29 wherein said apparatus is portable.

37. An apparatus for transporting residual material as defined in claim 29 further including disks mounted on said bottom of said apparatus to facilitate rotation of said sweep arm, said disks positioned within a recess in said floor when said storage vessel is storing material.

38. An apparatus for transporting residual material as defined in claim 29 wherein said trailing edge of said sweep arm further includes a pressure switch, said pressure switch operable to delay the rotation of said sweep arm.

39. An apparatus for transporting residual material as defined in claim 29 wherein said rotating means includes a cable routed around an outer circumference of said central outlet, said rotating means further including a series of pulleys.

40. An apparatus for transporting residual material as defined in claim 39 wherein said rotating means further includes a winch, said winch powered to reel in said rope thereby rotating said sweep arm about said support member.

41. An apparatus for transporting residual material as defined in claim 40 wherein said winch is portable.

42. An apparatus for transporting residual material as defined in claim 39 wherein said cable forms an endless loop and said sweep arm is rotated around said loop, said pulleys are power driven and mounted on said apparatus.

43. An apparatus for transporting residual material as defined in claim 29 wherein said rotating means includes a rack gear routed around an outer circumference of said central outlet, said rotating means further including a pinion gear mounted on said sweep conveyor, said pinion gear driven by a motor mounted on said apparatus.

44. An apparatus for transporting residual material as defined in claim 29 wherein said rotating means includes a wheel mounted on said apparatus, said wheel in contact with said floor and powered by a motor mounted on said apparatus.

* * * * *